US012748953B2

(12) United States Patent
Zuberi et al.

(10) Patent No.: US 12,748,953 B2
(45) Date of Patent: Sep. 29, 2026

(54) MULTI-EVENT TIME-SERIES ENCODING

(71) Applicant: THE TORONTO-DOMINION BANK, Toronto (CA)

(72) Inventors: Saba Zuberi, Toronto (CA); Maksims Volkovs, Toronto (CA); Aslesha Pokhrel, Toronto (CA); Alexander Jacob Labach, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 503 days.

(21) Appl. No.: 18/371,169

(22) Filed: Sep. 21, 2023

(65) Prior Publication Data

US 2024/0127036 A1 Apr. 18, 2024

Related U.S. Application Data

(60) Provisional application No. 63/411,932, filed on Sep. 30, 2022.

(51) Int. Cl.
*G06N 3/0455* (2023.01)

(52) U.S. Cl.
CPC .................................. *G06N 3/0455* (2023.01)

(58) Field of Classification Search
CPC .................................................... G06N 3/0455
See application file for complete search history.

(56) References Cited

U.S. PATENT DOCUMENTS 10,614,364 B2 * 4/2020 Krumm .................. G06Q 10/00
2018/0164781 A1 * 6/2018 Kubo ................. G05B 19/4083
2018/0285777 A1 * 10/2018 Li ............................ G06N 5/04

OTHER PUBLICATIONS

Bak, et al., "You Can't Have AI Both Ways: Balancing Health Data Privacy and Access Fairly," Frontiers in Genetics, vol. 13, Article 929453, Jun. 13, 2022, 7 pages; https://www.ncbi.nlm.nih.gov/pmc/articles/PMC9234328/pdf/fgene-13-929453.pdf.
Brown, et al., "Language Models are Few-Shot Learners," arXiv:2005.14165v4 [cs.CL], Jul. 22, 2020, 75 pages; https://arxiv.org/pdf/2005.14165.pdf.

(Continued)

*Primary Examiner* — Simon P Kanaan
(74) *Attorney, Agent, or Firm* — Hopewell IP, P.C.

(57) ABSTRACT

To improve processing with artificial intelligence and machine learning of multi-event time-series data, information about each event type is aggregated for a group of time bins, such that an event bin embedding represents the occurring events of that type in the time bin. The event bin embedding may be based on an aggregated event value summarizing the values of that event type in the bin and a count of those events. The event bin embeddings across event types and time bins may be combined with an embedding for static data about the data instance and a representation token for input to an encoder. The encoder may apply machine-learning blocks for an event-focused sublayer and a time-focused sublayer that attend to respective dimensions of the encoder. The model may be initially trained with self-supervised learning with time and event masking and then fine-tuned for particular applications.

20 Claims, 6 Drawing Sheets

(56) References Cited

OTHER PUBLICATIONS

Cao, et al., "Data Science and AI in FinTech: An Overview," International Journal of Data and Science Analytics, Aug. 5, 2021, 19 pages; https://arxiv.org/ftp/arxiv/papers/2007/2007.12681.pdf.
Caron, et al., "Emerging Properties in Self-Supervised Vision Transformers," Proceedings of the IEEE/CVF international conference on computer vision, pp. 9650-9660, arXiv:2104.14294v2 [cs.CV], May 24, 2021, 21 pages; https://arxiv.org/pdf/2104.14294.pdf.
Che, et al., "Recurrent Neural Networks for Multivariate Time Series with Missing Values," International Conference on Learning Representations, 2017, 15 pages; https://openreview.net/pdf?id=BJC8LF9ex.
Chen, et al., "Scaling Vision Transformers to Gigapixel Images via Hierarchical Self-Supervised Learning," IEEE/CVF Conference on Computer Vision and Pattern Recognition, pp. 16144-16155, Jun. 2022, 19 pages; https://arxiv.org/pdf/2206.02647.pdf.
Chen, et al., "Self-Supervised Vision Transformers Learn Visual Concepts in Histopathology," Learning Meaningful Representations of Life, arXiv:2203.00585v1 [cs.CV], Mar. 1, 2022, 11 pages; https://arxiv.org/pdf/2203.00585.pdf.
Chen, et al., "XGBoost: A Scalable Tree Boosting System," 22nd ACM SIGKDD International Conference on Knowledge Discovery and Data Mining, arXiv:1603.02754v3 [cs.LG], Jun. 10, 2016, 13 pages; https://arxiv.org/pdf/1603.02754.pdf.
Cho, et al., "On the Properties of Neural Machine Translation: Encoder-Decoder Approaches," arXiv:1409.1259v2 [cs.CL], Oct. 7, 2014, 9 pages; https:/arxiv.org/pdf/1409.1259.pdf.
Chopra, et al., "Learning a Similarity Metric Discriminatively, with Application to Face Verification," IEEE Computer Society Conference on Computer Vision and Pattern Recognition, vol. 1, pp. 539-546, 2005, 8 pages; http://yann.lecun.com/exdb/publis/pdf/chopra-05.pdf.
Darke, et al., "Benchmark Time Series Data Sets for PyTorch: The Torchtime Package," arXiv:2207.12503v2 [cs.LG], Aug. 1, 2022, 15 pages; https://arxiv.org/pdf/2207.12503.pdf.
Devlin, et al., "BERT: Pre-Training of Deep Bidirectional Transformers for Language Understanding," arXiv:1810.04805v2 [cs.CL], May 24, 2019, 16 pages; https://arxiv.org/pdf/1810.04805.pdf.
Dosovitskiy, et al., "An Image is Worth 16x16 Words: Transformers for Image Recognition at Scale," International Conference on Learning Representations, arXiv:2010.11929v2 [cs.CV], Jun. 3, 2021, 22 pages; https://arxiv.org/pdf/2010.11929.pdf.
Gomez-Losada, et al., "Time Series Forecasting by Recommendation: An Empirical Analysis on Amazon Marketplace," Business Information Systems, 22nd International Conference, vol. 1, May 2019, 10 pages; https://www.researchgate.net/publication/333832708_Time_Series_Forecasting_by_Recommendation_An_Empirical_Analysis_on_Amazon_Marketplace.
Grill, et al., "Bootstrap Your Own Latent a New Approach to Self-Supervised Learning," Advances in Neural Information Processing Systems, arXiv:2006.07733v3 [cs.LG], Sep. 10, 2020, 35 pages; https://arxiv.org/pdf/2006.07733.pdf.
Harutyunyan, et al., "Multitask Learning and Benchmarking with Clinical Time Series Data," arXiv:1703.07771v1 [stat.ML], Mar. 22, 2017, 11 pages; https://www.academia.edu/34055564/Multitask_Learning_and_Benchmarking_with_Clinical_Time_Series_Data.
He, et al., "Masked Autoencoders are Scalable Vision Learners," IEEE/CVF Conference on Computer Vision and Pattern Recognition, pp. 16000-16009, arXiv:2111.06377v3 [cs.CV], Dec. 19, 2021, 14 pages; https://arxiv.org/pdf/2111.06377.pdf.
Hochreiter, et al., "Long Short-Term Memory," Neural Computation, vol. 9, No. 8 : 1735-1780, Dec. 1997, 32 pages; https://www.researchgate.net/publication/13853244_Long_Short-term_Memory.
Johnson, et al., "MIMIC-IV," PhysioNet, Jun. 12, 2022, https://doi.org/10.13026/7vcr-e114.
Kidger, et al., "Neural Controlled Differential Equations for Irregular Time Series," 34th Conference on Neural Information Processing Systems (NeurIPS 2020), arXiv:2005.08926v2 [cs.LG], Nov. 5, 2020, 25 pages; https://arxiv.org/pdf/2005.08926.pdf.
Lechner, et al., "Learning Long-Term Dependencies in Irregularly-Sampled Time Series," arXiv:2006.04418v4 [cs.LG], Dec. 4, 2020, 19 pages; https://arxiv.org/pdf/2006.04418.pdf.
Li, et al., "Hi-BEHRT: Hierarchical Transformer-Based Model for Accurate Prediction of Clinical Events Using Multimodal Longitudinal Electronic Health Records," IEEE journal of biomedical and health informatics, vol. 27, No. 2, 2022, 11 pages; https://arxiv.org/ftp/arxiv/papers/2106/2106.11360.pdf.
Lipton, et al., "Model Missing Data in Clinical Time Series with RNNs," Machine Learning for Healthcare, vol. 56, No. 56, arXiv:1606.04130v5 [cs.LG], Nov. 11, 2016, 17 pages; https://arxiv.org/pdf/1606.04130.pdf.
Loshchilov, et al., "Decoupled Weight Decay Regularization," International Conference on Learning Representations 2019, arXiv:1711.05101v3 [cs.LG], Jan. 4, 2019, 19 pages; https://arxiv.org/pdf/1711.05101.pdf.
Mcdermott, et al., "A Comprehensive EHR Timeseries Pre-Training Benchmark," Conference on Health, Inference, and Learning, pp. 257-278, Apr. 8, 2021, 23 pages; https://dl.acm.org/doi/pdf/10.1145/3450439.3451877.
Mozer, et al., Discrete-Event Continuous-Time Recurrent Nets, arXiv:1710.04110v1 [cs.NE], Oct. 11, 2017, 21 pages; https://arxiv.org/pdf/1710.04110.pdf.
Nguyen, et al., "Transformers without Tears: Improving the Normalization of Self-Attention," arXiv:1910.05895v2 [cs.CL], Dec. 30, 2019, 11 pages; https://arxiv.org/pdf/1910.05895.pdf.
Radford, et al., "Learning Transferable Visual Models from Natural Language Supervision," 38th International Conference on Machine Learning, arXiv:2103.00020v1 [cs.CV], Feb. 26, 2021, 48 pages; https://arxiv.org/pdf/2103.00020.pdf.
Ren, et al., "RAPT: Pre-Training of Time-Aware Transformer for Learning Robust Healthcare Representation," 27th ACM Sigkdd Conference on Knowledge Discovery & Data Mining, Aug. 14, 2021, 9 pages; https://www.bigscity.com/publications/pre-training-of-time-aware-transformer-for-learning-robust-healthcare-representation/.
Rubanova, et al., "Latent ODEs for Irregularly-Sampled Time Series," Advances in Neural Information Processing Systems 32, arXiv:1907.03907v1 [cs.LG], Jul. 8, 2019, 21 pages; https://arxiv.org/pdf/1907.03907.pdf.
Shukla, et al., "Multi-Time Attention Networks for Irregularly Sampled Time Series," International Conference on Learning Representations 2021, arXiv:2101.10318v2 [cs.LG], Jun. 7, 2021, 15 pages; https://arxiv.org/pdf/2101.10318.pdf.
Shwartz-Ziv, et al., "Tabular Data: Deep Learning is Not All You Need," Information Fusion, 81, pp. 84-90, arXiv:2106.03253v2 [cs.LG], Nov. 23, 2021, 13 pages; https://arxiv.org/pdf/2106.03253.pdf.
Silva, et al., "Predicting Mortality of ICU Patients: The PhysioNet/Computing in Cardiology Challenge 2012," Computing in Cardiology, pp. 245-248, 2012, 4 pages; https://lcp.mit.edu/pdf/SilvaCinC12.pdf.
Soenksen, et al., "Integrated Multimodal Artificial Intelligence Framework for Healthcare Applications," NPJ digital medicine, vol. 5, No. 1, p. 149, Sep. 2022, 10 pages; https://www.nature.com/articles/s41746-022-00689-4.pdf.
Tipirneni, et al., "Self-Supervised Transformer for Sparse and Irregularly Sampled Multivariate Clinical Time-Series," ACM Transactions on Knowledge Discovery from Data, vol. 1, No. 1, arXiv:2107.14293v2 [cs.LG], Feb. 16, 2022, 18 pages; https://arxiv.org/pdf/2107.14293v2.pdf.
Van Der Maaten, et al., "Visualizing Data using t-SNE," Journal of Machine Learning Research 9, 2008, 26 pages; https://www.cns.nyu.edu/events/spf/SPF_papers/JMLR_Final.pdf.
Vaswani, et al., "Attention is All you Need," Advances in Neural Information Processing Systems 30, 2017, 11 pages; https://papers.nips.cc/paper/2017/file/3f5ee243547dee91fbd053c1c4a845aa-Paper.pdf.
Wang, et al., "Linformer: Self-Attention with Linear Complexity," arXiv:2006.04768v3 [cs.LG], Jun. 14, 2020, 12 pages; https://arxiv.org/pdf/2006.04768.pdf.

(56) References Cited

OTHER PUBLICATIONS

Wen, et al., “Transformers in Time Series: A Survey,” arXiv:2202.07125v5 [cs.LG], May 11, 2023, 9 pages; https://arxiv.org/pdf/2202.07125.pdf.

Xiong, et al., “On Layer Normalization in the Transformer Architecture,” 37th International Conference on Machine Learning, arXiv:2002.04745v2 [cs.LG], Jun. 29, 2020, 17 pages; https://arxiv.org/pdf/2002.04745.pdf.

Zhang, et al., “Daily-Aware Personalized Recommendation Based on Feature-Level Time Series Analysis,” 24th International Conference on World Wide Web, pp. 1373-1383, May 18, 2015, 11 pages; https://www.cs.cmu.edu/~glai1/papers/yongfeng-guokun-www15.pdf.

Zhang, et al., “Graph-Guided Network for Irregularly Sampled Multivariate Time Series,” International Conference on Learning Representations 2022, arXiv:2110.05357v2 [cs.LG], Mar. 16, 2022, 21 pages; https://arxiv.org/pdf/2110.05357.pdf.

* cited by examiner

MULTI-EVENT TIME-SERIES ENCODING

CROSS-REFERENCE TO RELATED APPLICATIONS

This application claims the priority benefit of U.S. Provisional Application No. 63/411,932, filed Sep. 30, 2022, the contents of which are hereby incorporated by reference in the entirety.

BACKGROUND

This disclosure relates generally to machine modeling of time-series data and more particularly to effective encoding and modeling predictions for sparse and/or multi-event time-series data.

In many real-world contexts, relevant data to be modeled with machine-learned models may represent different types of data corresponding to different events that occur at different rates in different data samples (also referred to herein as data instances), which may include one event type occurring at relatively consistent frequencies along with other event types that occur sporadically, stochastically, or not at all. As such, for a particular data sample, certain event types (from all possible event types) may occur at different points in time, at different rates across time, and particular data samples may not include all event types.

As one example, electronic health record (EHR) data collected in a hospital contains an immense amount of information about patients. This data typically comes in the form of vital sign measurements, lab results, and diagnoses/treatments, each of which may be characterized as a "type" of event. Patients in an Intensive Care Unit (ICU) are particularly heavily monitored, with frequent vital sign observations and diagnostic tests. In addition, the irregularity and sparsity of observations over time may also implicitly contain information about treatment choices and the evolution of the patient's state. As such, the number and type of recorded events may contain information about the working clinical hypotheses that a clinician has formed about a patient. The resulting multivariate time-series is high-dimensional, sparse, and irregularly distributed across time, making it challenging to apply standard time-series analysis methods that are primarily designed for densely sampled data. These challenges are not unique to health care, and data with such characteristics commonly arises in fields such as finance, banking, and e-commerce, along with other contexts.

In addition, attempts to model such data often struggle to effectively capture the different types of events, time sequence, sparsity, and other characteristics. As such, models may ineffectively represent the data sample as a whole by inadequately capturing relationships across events and time. As one example, Transformer-style models are typically applied over a single dimension of interest that varies across time. However, naively applying these approaches across the time dimension of multi-event time-series data such as EHR data means losing information captured by individual types of events and thus limit the model's ability to capture important relationships between different event types. As another challenge, solutions that attempt to encode each event as an input sequence element are difficult to scale effectively since memory and runtime complexity of self-attention layers scales quadratically with input length, and patients can have hundreds of events in a relatively short period of time. In addition, training large models with this sequential EHR input representation consequently requires significant hardware resources or aggressive input truncation, both of which can negatively impact accuracy.

SUMMARY

To improve representation of such time-series data and efficacy of subsequent predictive tasks, the time-series data is encoded with one or more encoding layers that include an event-wise sublayer and a time-wise sublayer. The data instance is structured for input to the encoding layers as a plurality of time bins, each of which includes embeddings representing each of the various event types. For each event type in each time bin, values along a number of embedding dimensions represent events of that event type for that time as an event bin embedding. In one embodiment, each event bin embedding is generated based on a quantity of the event type and an event bin value describing an aggregation of the values of the events of the event type occurring within that time bin. In one embodiment, the quantity and event bin value for an event within a particular time bin is applied as an input to a machine-learned model layer, such as a multi-layer perceptron, to generate the event bin embedding representing that event type in that time bin.

As such, an instance representation of a particular data sample may include a binned multi-event representation including event bin embeddings for each of the events across a number of sequential times. In some embodiments, the instance representation also includes a static variable embedding describing time-invariant data that is constant across the data instance. The instance representation may also include a representation token that may be determined during training and used as an output of the encoder to represent the data instance for further classification or other interpretive tasks. The instance representation may then be processed by encoder blocks that include a sublayer that may process its input with attention across events and another sublayer that processes its input with attention across time bins. To do so, the input to the layer may be segmented or "flattened" with respect to event type or time bins for each sublayer to perform respective event and time processing. As such, while the input to the encoder block(s) may include a plurality of embedding dimensions across multiple time bin and event type dimensions, the different sublayers permit attention across the various time bins and event types. In some embodiments, additional time and event type embeddings are injected at each sublayer to provide further context to the sublayer processing. After processing by the encoder blocks, the output is an encoded instance representation that may then be used for various applications.

In some embodiments, parameters of the model may be trained with self-supervised learning by masking event types and/or time bins and learning parameters for predicting the masked information. In some embodiments, the self-supervised learning may be trained to predict the number of events of the event type (e.g., as a Boolean presence of the event type or a quantity) along with the aggregated event value. The encoded instance representation may be used for further applications, for example with a decoder that predicts additional information based on the encoded instance representation. In some embodiments, the decoder may use the position of the representation token in the encoded instance representation as an input for classification and other predictive tasks. In these embodiments, the value of the representation token in the instance representation may be trained during training of the decoder, such that the representation token may be learned (and the output used) during fine-tuning of the model for application to particular tasks.

By time binning the events and aggregating information for particular events within each time bin, information about each event can be effectively represented for the data instance despite high differences in data event sparsity across data samples and event types. In addition, the time binning enables variable-length data samples (with respect to time) to be represented as a consistent size as an input to the encoding block. Finally, the time-focused and event-focused sublayers enables the encoding to capture relationships across both dimensions that provides for improved accuracy on multiple downstream tasks.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architecture Overview

Figure 1:
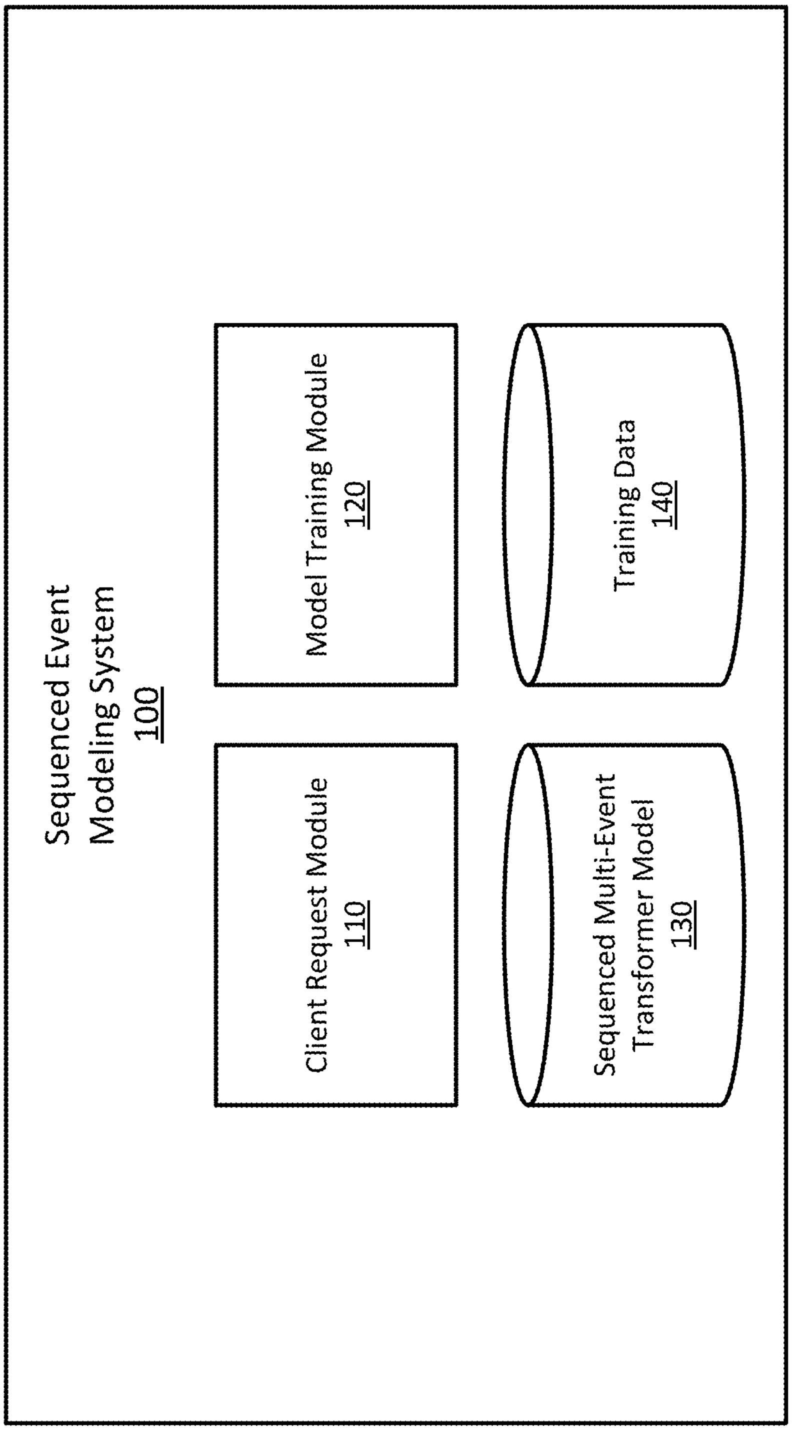
FIG. 1 shows a sequenced event modeling system that includes a sequenced multi-event transformer model, according to one embodiment.

FIG. 1 shows a sequenced event modeling system 100 that includes a sequenced multi-event transformer model 130, according to one embodiment. The sequenced multi-event transformer model 130 is a trained computer model that learns parameters for encoding information about time-series data including multiple event types across time. The sequenced multi-event transformer model 130 may include an encoder for encoding the time-series data and a decoder for interpreting an encoded representation for various predictive tasks. Patient health data and hospital stays by patients is one example type of data that may be processed by the sequenced event modeling system 100 and may be used with the decoder to predict, for example, long term patient risk or likelihood of discharge from the ICU. The sequenced time-series data includes data relating to various types of events that may occur at different frequencies across the time-series. In some embodiments, each data series instance may also have a different length of time.

In operation, the sequenced multi-event transformer model 130 processes the sequenced time-series data to generate an instance representation and applies an encoder to generate an encoded instance representation used for further predictions. The instance representation describes the time-series data instance as individual event types differ across time. As such, the instance representation input to the encoder may maintain dimensionality describing the multiple events and sequence across time that they occur. To more effectively account for the different events and their relationships to one another as well as across the time-series, the encoder includes at least one sublayer that focuses on event-wise processing (e.g., event-wise attention) along with at least one sublayer that focuses on time-wise processing (e.g., time-wise attention). The architecture of the sequenced multi-event transformer model 130 is further discussed with respect to FIG. 2.

A model training module 120 may use training data 140 for training parameters and other configuration settings of the sequenced multi-event transformer model 130. The training data 140 may include training data related to various data samples or "instances" to be used for determining parameters of the model. As discussed further below, the training process by the model training module 120 may include training phases that include self-supervised learning to learn parameters for relevant relationships among the data instances along with fine-tuning to learn parameters for application to a particular goal of a decoder.

The training data 140 may thus include various data instances in the general category of information processed by the sequenced multi-event transformer model 130 that may be used for self-supervised learning of the model parameters, and a group (e.g., a subset) of data instances associated with a particular type of prediction to be made by the model. For example, hospital data related to many different patients admitted for various reasons may be included in the training data 140 and used for self-supervised learning. To fine-tune the model, instances related to specific types of patients related to a specific type of outcome (e.g., likelihood of re-admission within three months for patients initially admitted for a cardiac event) may be used.

The model training module 120 may train parameters of the model based on a training loss that parameterizes the prediction error of the model with respect to events across time (which may include evaluating an error for predicting the value of an event and whether an event occurred with respect to a particular time bin). The training process may use backpropagation, gradient descent (or its variants) and other training techniques for modifying model parameters to reduce the training loss. Further details of embodiments of the training process and a training loss are discussed with respect to FIG. 6.

Finally, the client request module 110 may apply the trained sequenced multi-event transformer model 130 to received requests and provide the output to requestors. For example, the client request module 110 may receive an input sequence of events (e.g., events occurring during a patient stay of a patient admitted for a cardiac event), apply the input sequence of events to the sequenced multi-event transformer model 130 trained for predicting cardiac reoccurrence, and provide the output sequence of tokens to the requestor.

The sequenced event modeling system 100 is shown in relation to the components particularly related to the improved operation and training of the sequenced multi-event transformer model 130 as further discussed below. As such, the particular environment in which the sequenced event modeling system 100 operates may differ in various embodiments, as the sequenced event modeling system 100 may be operated on a server that receives requests from remote computing systems for application of requests to the sequenced multi-event transformer model 130. In other embodiments, the sequenced multi-transformer model 130 may be trained by one computing system and deployed to another computing system for application (e.g., download by a mobile device for operation of the sequenced multi-event transformer model 130). As such, the sequenced event modeling system 100 is any suitable computing system and components as disclosed below may be separated or combined appropriately across different computing systems for operation. For example, training of the sequenced multi-event transformer model 130 may also be executed by a plurality of systems in parallel that may share information about modifying model parameters during training. Similarly, further components and features of systems that may include the sequenced event modeling system 100 itself and systems that may include components of the sequenced event modeling system 100 may vary and include more or fewer components than those explicitly discussed herein.

The sequenced multi-event transformer model 130 is termed a "transformer" as it includes an encoder with various layers and attentional processes. In some embodiments, although termed a "transformer," the sequenced multi-event transformer model 130 includes an encoder without associated decoder elements for a particular task. As such, the sequenced multi-event transformer model 130 may include an encoder (e.g., after self-supervised learning) for generating effective encoded instance representations of multiple event types sequenced over time. The encoded instance representations in some embodiments may then be further processed by additional systems that include or apply decoders to "fixed" encoded instance representations or for independent fine-tuning for different desired interpretive tasks.

In addition, the model training and its application may include collaboration between different entities, including privacy-preserving training approaches for sharing of relevant parameters without excess privacy costs. These and other processes may be used in conjunction with the sequenced multi-event transformer model 130 of the sequenced event modeling system 100 in various embodiments.

Figure 2:
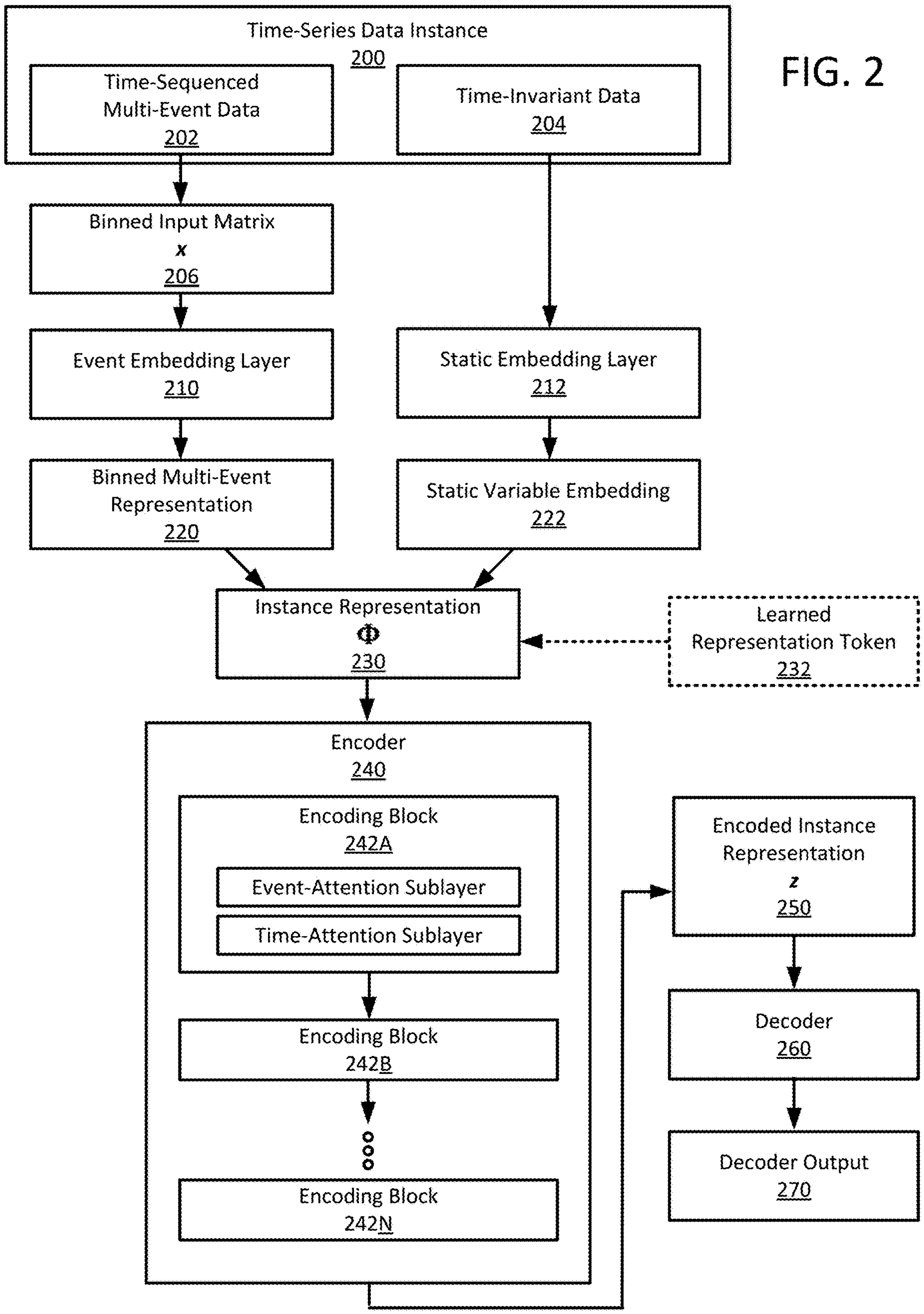
FIG. 2 provides a general overview of a processing architecture for a sequenced multi-event transformer model, according to one embodiment.

FIG. 2 provides a general overview of a processing architecture for a sequenced multi-event transformer model 130, according to one embodiment. The sequenced multi-event transformer model 130 may include various components for preparing a time-series data instance 200 for input as an instance representation 230 to an encoder 240 for generation of an encoded instance representation 250 that may be decoded to one or more predictions as a decoder output 270 by a decoder 260. The particular layers and processing steps shown in FIG. 2 may vary in different embodiments, such that the particular ways in which the time-series data instance 200 is processed to determine the instance representation 230, along with the particular layers of the encoder 240 and decoder 260, may vary in different embodiments.

Initially, a time-series data instance 200 may include a set of time-sequenced multi-event data 202 in addition to a set of time-invariant data 204. The time-sequenced multi-event data 202 includes a set of events that occur in a sequence, such that each event is associated with an event type, event time, and event value. The event type specifies one of a plurality of event types that may be represented for the particular category of data instance. In the patient health record example, the various event types may include all types of event types occurring in the training data sets and may include recorded events in a patient's chart. In the healthcare example, these may include results of regular patient monitoring (e.g., heart rate, blood pressure), along with specifically-ordered tests (e.g., blood or urine analysis), procedures, and other measurable events that may occur over the course of the patient's stay. Many such events may occur relatively frequently, such as blood pressure or heart rate readings. Other types of event types include relatively infrequent events, such as a particular treatment applied to or removed from a patient, such as applying or removing a ventilator. The event values may differ for different event types; certain events may have event values that are Boolean (e.g., beginning a ventilator for a patient), while other event types, such as heartrate or blood pressure, may have a range of possible event values.

The time-series data instance 200 may also include a set of time-invariant data 204 describing data about the data instance that does not change over time. The time-invariant data 204 may include, for example, characteristics or metadata about the data instance as a whole. For example, in the healthcare example, the time-invariant data 204 may include a patient's age, sex, height, weight, incoming complaint, and other characteristics of the patient. This time-invariant invariant data 204 thus may be relevant for consideration in evaluating the data instance but typically does not represent discrete "events" that may occur (or change) over the course of the time-sequenced data.

The time-series data instance 200 is processed to the instance representation 230 for the time-series data instance 200 including a binned multi-event representation 220 that embeds information about the time-sequenced multi-event data 202 across events and time. In some embodiments, the instance representation 230 may also include a static variable embedding 222 and/or a learned representation token 232. The binned multi-event representation 220 in one embodiment includes a tensor (e.g., a 3-dimensional matrix) that describes events of each event time for each with embeddings across event and time dimensions.

To generate the binned multi-event representation 220, the time-sequenced multi-event data 202 is binned to a number of time bins corresponding to the number of time dimensions in the binned multi-event representation 220. Each event type is represented in respective time bins by an aggregated bin value in a binned input matrix 206. The binned input matrix may be formally referred to herein as $x \in \mathbb{R}^{n_e \times n_t}$ and includes dimensions across a number of events $n_e$ and a number of time bins $n_t$. Each position $x_{i,j}$ of the binned input matrix 206 may then be processed by an event embedding layer 210 to generate event bin embeddings $\phi_{i,j}$ for respective positions in the binned multi-event representation 220. The event embedding layer 210 is a layer of the transformer model that includes a set of configurable parameters for generating embeddings for the binned event values. In one embodiment, the event embedding layer 210 is a multi-layer perceptron (MLP) with configurable parameters for combining the inputs to output values corresponding to the embedding dimensions. The event embedding layer 210 may include multiple individual "layers" and may include additional functions, such as normalization, regularization, and so forth. In some embodiments, such as the example discussed below with respect to FIG. 3, the event bin embeddings are generated based on the bin value as well as a number of events of that event type occurring in that time bin. Events for each event type within a time bin may thus be represented as an embedding having a number of embedding dimensions d, such that the binned multi-event representation 220 represents the various events as they occur over time in the time-sequenced multi-event data 202. The generation of the binned multi-event representation is discussed further below with respect to FIG. 3.

The time-invariant data 204 may also be represented in the instance representation 230 as a static variable embedding 222 generated by a static embedding layer 212. As with the event embedding layer 210, the static embedding layer 212 may be a MLP or other trainable layer for generating an embedding representation of d dimensions for the static variable embedding 222. Because the time-invariant data 204 is constant, the static variable embedding 222 is one embedding representing the time-invariant data 204 that is not associated with changes over time. As discussed below, the static variable embedding 222, although it does not vary with time, may be included in the instance representation 230 in association with each time bin, such that time-wise processing may account for the static variables within the encoder structure.

Data Instance Representation

Figure 3:
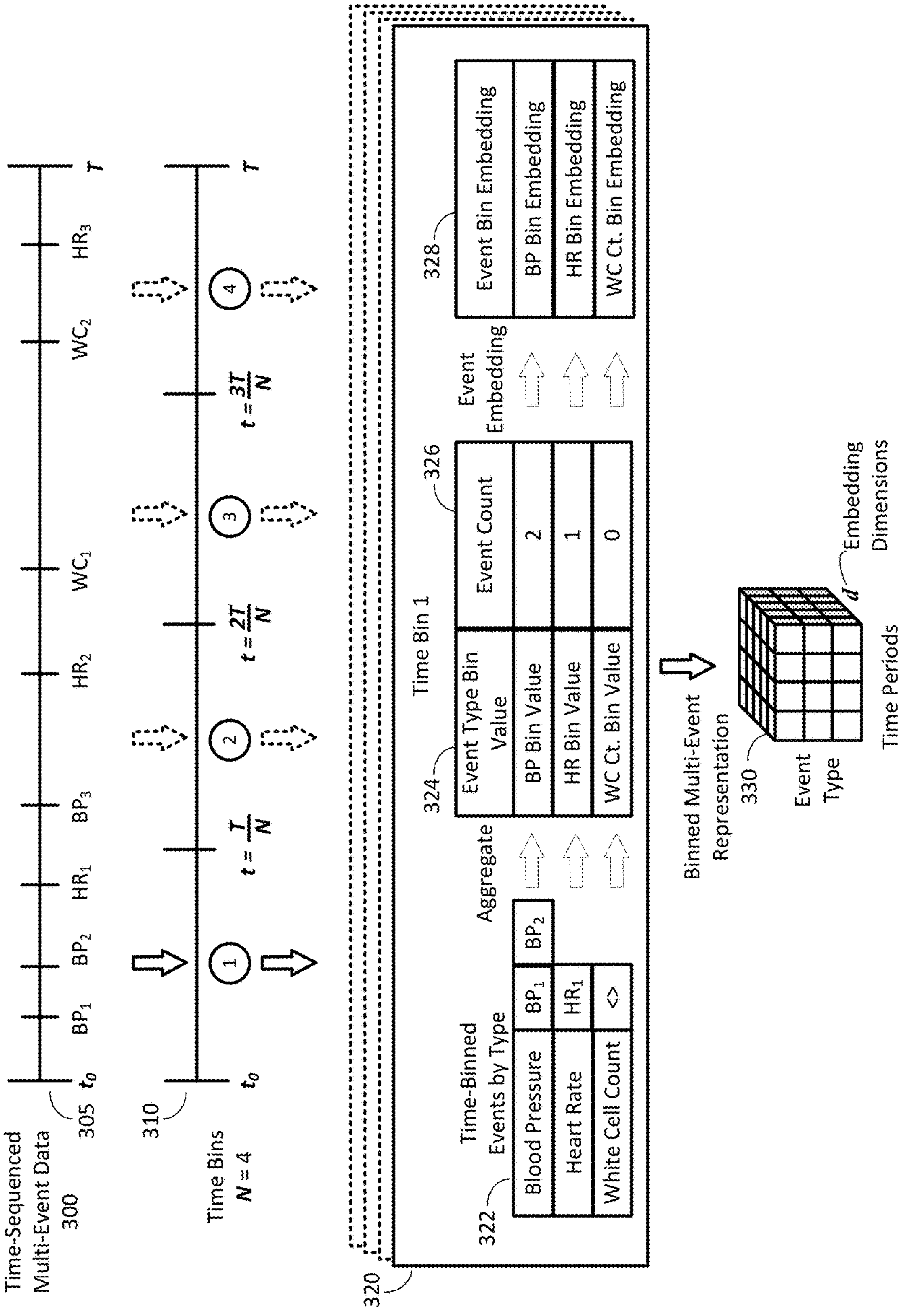
FIG. 3 shows an example generation of a binned multi-event representation from a set of time-sequenced multi-event data for a data instance, according to one embodiment.

FIG. 3 shows an example generation of a binned multi-event representation 330 from a set of time-sequenced multi-event data 300 for a data instance, according to one embodiment. In the example of FIG. 3 (and with further examples in FIGS. 4-5), the data instances may relate to three event types that may be measured in a healthcare setting: Blood Pressure (BP), Heart Rate (HR) and White Cell Count (WC Ct.). In practice, the number of event types may be significantly higher and may be based on the number of types of events and their characterization in the particular dataset. The number of event types may thus include tens, hundreds, or more of different event types depending on the data configuration and data types.

In addition to the health-related examples generally discussed herein, additional categories of time-sequenced multi-event data may also be used in various embodiments. In addition to health-related examples, finance-related information about persons or other entities may often be presented in similar multi-event contexts that vary across time. For example, credit risk information may include events related to a person's credit history, such as credit card usage, personal loans, mortgage payment history, and so forth that may include events occurring at different frequencies for different persons for whom different lengths of event history are available. As another financial example, events related to estimating valuation for a company, real estate, or other financial instruments may also be characterized with various types of events occurring at different frequencies and may similarly be modeled in various embodiments.

Events are visualized on a timeline 305 with a beginning time $t_0$ to an end time T. For certain types of data, the length of the time-sequenced multi-event data 300 may differ for different data samples, such that the total time T may differ. As an example, event data relating to patient stays in an intensive care unit (ICU) may be recorded from patient admittance ($t_0$) to patient discharge (T), which may differ from patient to patient, as some patients may stay in the ICU for a portion of a day, while others may stay for several days or more.

As shown in the illustrated timeline in FIG. 3, the time-sequenced multi-event data 300 may include different occurrences of the various events across a total time T for the time-sequenced data. Each individual event is labeled with an event type, event value, and an associated time of the event. In the illustration of FIG. 3, the event types are labeled with respect to each consecutive instance of the event type in the time sequence, such that the first blood pressure event is labeled $BP_1$, the second blood pressure event is labeled $BP_2$, and so forth. Though labeled sequentially on a timeline 305 for convenience, the events may not be expressly associated with a timeline or relative sequence within the timeline.

To represent and standardize the various events, which may occur at different times and frequencies over a variable-length timeline 305, the events are grouped according to a set of time bins 310 that correspond to a number of time periods in the binned multi-event representation 330. The particular number of time bins may vary in different embodiments and may be increased or decreased to modify the granularity at which the events are represented and the size of the binned multi-event representation 330 (and thus the complexity and runtime of the downstream modeling). In the example of FIG. 3, the number of time bins is set to 4, such that the events are grouped in fourths: from $t_0$ to $$\frac{T}{N}, \frac{T}{N} \text{ to } \frac{2T}{N}, \frac{2T}{N} \text{ to } \frac{3T}{N},$$

etc.

The events of each time bin 320 are then processed to generate respective event bin embeddings 328. First, the respective time-binned events for each event type 322 are identified for the time bin. In the example of FIG. 3, events $BP_1$, $BP_2$, and $HR_1$ are grouped within the first time bin, while there are no events for White Cell Count within the first time bin. In some embodiments, the event bin embeddings 328 may be generated directly from the number and sequence of the time-binned events 322. For example, each event value may be sequenced in time as tokens for a sequential encoder to generate a respective event bin embedding 328.

In further embodiments, the binned events for each event are aggregated to generate a single bin value 324 representing the event value in the respective time bin. The event values may be aggregated according to an aggregation function that summarizes the event value in the time bin. The aggregation function may be an average, maximum, minimum, most-recent, or other evaluation of the event values of the individual events of that type in the respective time bin. For example, the aggregation function may average the respective events, such that the BP bin value 324 in this example is an average of $BP_1$ and $BP_2$ of the time-binned events 322. The event type bin value 324 for a particular event type i and time bin j may form the respective position $x_{i,j}$ in the binned input matrix x.

In addition to a bin value, the number of events of the event type may also be determined as a respective event quantity 326. The event count may be stored in a count matrix m, such that the respective event i and time j are stored as position $m_{i,j}$. As such, in some embodiments, the binned events may be summarized according to the quantity and value of the events for processing by an event embedding layer to the event bin embedding 328. In some embodiments, the event embedding layer receives a concatenated input of the respective positions of the binned input matrix x and count matrix m. The event embedding receives the event bin value and event count and generates the respective event bin embedding 328 for that event type in that time bin, enabling the event bin embedding 328 to represent the events of that time within that time bin. Formally, the event embedding, having dimensionality d, for an event i and time bin j, may be referred to as $\phi_{i,j} \in \mathbb{R}^d$.

By expressly including the event quantity 326 in generating the event bin embeddings 328, the resulting embeddings may more effectively account for information that may be implicit in the frequency that a particular event occurs, even when the event bin value may be relatively typical. For example, in the hospital context, a patient at risk of a significant vital sign drop may have the vital sign measured relatively frequently or even continually. Although the vital sign may not have actually dropped within a time bin (e.g., resulting in a "normal" event bin value), accounting for the relatively high event quantity in the time bin enables effective representation and inference based on the increased monitoring frequency. As such, the frequency at which events occur, including when events do not occur, may be included to capture additional information that may be otherwise difficult to represent well.

In some embodiments, the event quantity 326 may be further processed by an embedding function before input to the event embedding layer. The embedding function an embedding function $p^m(\cdot)$ maps integer count values to discrete bins, then maps each bin to a learned scalar. In some embodiments, including this embedding function may improve performance with respect to gradient scaling when training model parameters.

The event embedding layer may be shared across the various event types and time bins, such that the particular event values and event counts are similarly encoded by the event embedding layer. When event type and time bin information is not accounted for in the resulting event bin embeddings 328 or inherently defined by the structure of the subsequent multi-event representation, information about the particular event types and time bins may be included during the encoder layers as time and event embeddings discussed below. When a shared event embedding layer is applied, a single layer may thus be learned for application across many event types, enabling reduced model complexity.

When a shared event embedding layer is a MLP and the event count is represented by the embedding function $p^m$, the overall processing to generate an event bin embedding $\phi_{i,j}$ may be determined as: $\phi_{i,j}=\text{MLP}([x_{i,j}, p^m(m_{i,j})])$, in which $[\cdot,\cdot]$ is concatenation.

In further embodiments, the event type and/or time bin information may be included as inputs to be encoded by the event embedding layer for representation in the event bin embedding 328. As such, embodiments may also include different event embedding layers (and/or models) for embedding different event types and/or different times. In general, various approaches for embedding the time-binned events to generate event bin embeddings 328 that describe events in particular time bins may be used. In general, the instance representation discussed below for the encoder further discussed below may operate on various approaches for embedding the different events across time.

As one example, additional types of events that are not readily representable with "event values" or "counts" may be included, such as other types of events for which embeddings may be generated that represents that event type. These types of events may be generated separately and in addition to the event type embeddings discussed above. For example, such events may include text such as a medical provider's written notes or summary about a patient. These events may be encoded for use with the other types of events with any suitable process for summarizing the events with respect to time bins in conjunction with other event types. For text, this may include, for example, applying a textual transformer or other sequence-aware encoder for the text to generate an embedding of dimension d for use in relation to a time bin. As an additional example, events such as images (e.g., from various modalities of medical imaging) may be described as events based on an interpretation of the image (e.g., from a radiologist) as a category or a written description. The image itself may also be an "event" that may be characterized as an embedding for the time bin, for example with various image processing layers applied to the image. This may permit additional event types to be included for representing the time-series data in addition to those represented based on the aggregated event value.

The various event bin embeddings 328 across the event types and time bins may then be represented as a binned multi-event representation 330. As discussed above, each of the event types and time bins may be represented with a respective embedding of dimension d, such that the overall binned multi-event representation may have dimensions $\mathbb{R}^{n_e \times n_t \times d}$. In this example, each combination of the three event types across four time bins is represented by a five-dimensional embedding.

Figure 4:
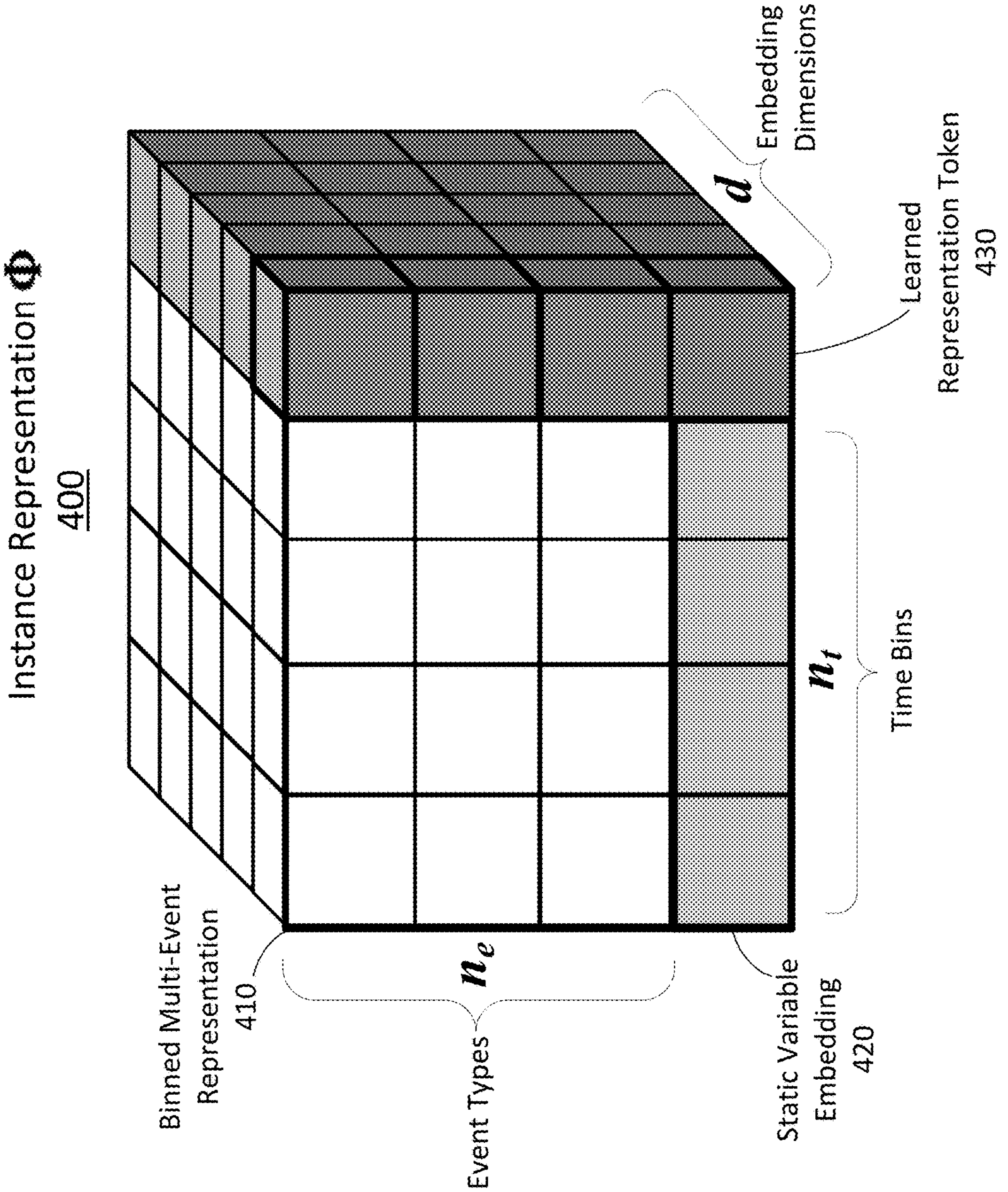
FIG. 4 shows an example instance representation, according to one embodiment.

FIG. 4 shows an example instance representation 400, according to one embodiment. The instance representation 400 refers to the representation of a data instance before input to the encoder layer. As discussed earlier with respect to FIG. 2, the instance representation 400 may include a binned multi-event representation 410, which may include dimensions across the number of event types $n_e$, time bins $n_t$, and embedding dimensions d. A static variable embedding 420 and a learned representation token 430 may be included as further "dimensions" of the instance representation 400. As the encoder may apply event and time-wise processing layers, adding the static variable embedding 420 as an additional "event" enables information about the static variable embedding 420 to be incorporated when processing each time bin. Similarly, as discussed further below, the learned representation token 430 may be learned during training and the output of the encoder at the position of the learned representation token 430 may be used for various predictive tasks by the decoder. The learned representation token may also be referred to as [REP]. In the example of FIG. 4, the addition of the static variable embedding 420 and learned representation token 430 may thus increase the dimensionality of the instance representation 400, such that the total size is $\mathbb{R}^{(n_e+1)\times(n_t+1)\times d}$. By binning events by type and time and generating representations in embeddings combined with the static variables and the learned representation token 430, the instance representation 400 may thus be a constant-size tensor effectively representing instances with variable event types, frequencies, and time lengths.

Encoder Architecture

Returning to FIG. 2, the instance representation 230, which may be generated as discussed with respect to FIGS. 3-4, may form an input to the first layer of the encoder 240. The encoder 240 includes a plurality of encoding blocks 242A-N, each of which may apply one or more computer model layers to further process the respective layer's input. In general, the encoding blocks 242 are applied in sequence, such that the output of a layer is the input to a subsequent layer until an output of the final layer 242N may be used as the encoded instance representation 250 to represent the instance for further prediction and interpretation by the decoder 260. The encoding blocks 242 include at least one encoding block that includes an event-attention sublayer and a time-attention sublayer. These sublayers apply attention and other processing oriented with respect to events and time bins as further discussed with respect to FIG. 5. In some embodiments, the encoding blocks 242 include the same structure (but may have different learned parameters) for processing the respective layer inputs. In general, the encoder 240 thus applies a sequence of machine-learned layers, such as attention layers, feedforward layers, normalization layers, and so forth for processing the instance representation 230 to the encoded instance representation 250. The particular number and type of layers, configuration of their parameters, and so forth differ in various embodiments and may include more or fewer layers than those specifically discussed. For example, while one embodiment of the encoder includes a plurality of sequential, identically-structured encoding blocks 242A-N, in some embodiments, the specific layers of each encoding block may differ as layers may be added or removed in one encoding block relative to another.

The decoder 260 may then apply the encoded instance representation 250 to generate a decoder output 270. In general, the parameters of the encoder 240, along with other embeddings and embedding layers (e.g., event embedding layer 210 and static embedding layer 212) are trained to learn parameters, such that the resulting encoded instance representation 250 is effective to represent the instance for the respective task of the decoder output 270. As discussed below with respect to FIG. 6, in some embodiments, a decoder 260 may be used for self-supervised learning with respect to masked values of the input instance, encouraging the model to learn parameters for effectively representing information across events and across time bins. In addition, the decoder 260 may be configured to use all or a part of the encoded instance representation 250 for various predictive tasks with respect to the data instance, such as the likelihood of particular characteristics or further events for the data instance.

Figure 5:
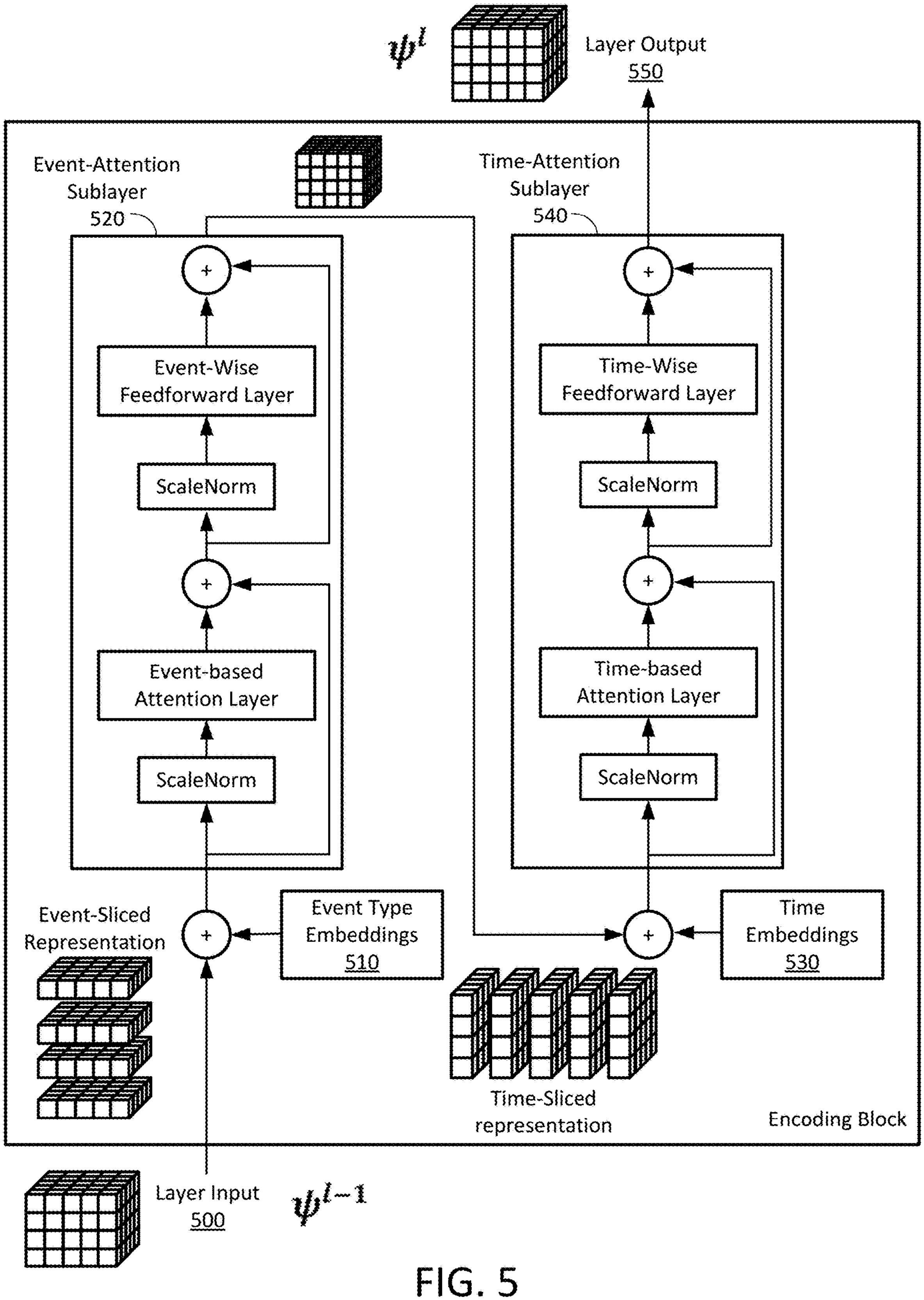
FIG. 5 shows an example architecture for an encoding block, according to one embodiment.

FIG. 5 shows an example architecture for an encoding block, according to one embodiment. Initially, the encoding block may receive a layer input 500, which may be from a prior layer of the encoder or, for the first layer, the instance representation of the data instance. The encoding block architecture shown in FIG. 5 includes two sublayers—an event-attention sublayer 520 and a time-attention sublayer 540. In general, each sublayer applies an attention and feedforward layer along the respective dimension (event or time bin) of interest. Though an event-attention sublayer 520 is applied first, followed by the time-attention sublayer 540 in the illustrated encoding block of FIG. 5, in other embodiments the order of these sublayers may differ. Further, as discussed above, the encoder may include several such encoding blocks applied in sequence and may also include the encoding block shown in FIG. 5 along with different types of encoding blocks having different layers.

For application of each sublayer, the layer input 500 may separated according to the respective dimension for processing in that layer. As such, for the event-attention sublayer 520, the layer input 500 may be segmented or "sliced" to a group of event-sliced representations along the "event" dimension of the layer input 500. For the time-attention sublayer 540, the sublayer input may be segmented or "sliced" along the separate time bins, resulting in a group of time-sliced representations. For the event-sliced representations, each event-sliced representation represents an individual event along the event dimension of the input tensor and may include the embeddings for the respective event type across all of the time bins. Thus, each event-sliced representation may include $n_t \times d$ values. In some embodiments, the event-sliced representation may be "unrolled" such that the multi-dimensional representation (here, 2-dimensional across the number of time bins and number of embedding dimensions) is converted to a one-dimensional representation for processing in the event-attention sublayer 520. The event-sliced representation may be "unrolled" by concatenating the embedding values of each sequential time bin. The event-sliced representations may then be "unrolled" and combined to "ungroup" event-sliced representations and restructure the representations as a three-dimensional tensor (which may have the same dimensionality of the sublayer input).

Similarly, the time-sliced representations represent an individual time bin along the time bin dimension of the input tensor and may include the embeddings for all event types of the respective time bin. In the example of FIG. 4, there are three event types along with one "event" that represents the static variable embedding 420, such that there are four event-sliced representations. Similarly, this example has four time bins along with one additional "time" bin with the "representation" token, such that there are five total time-sliced representations. Similar to the event-sliced representation, the time-sliced representation may be "unrolled" with respect to the multiple event types in a time bin to form a one-dimensional vector for processing in the time-attention sublayer 540. Likewise, after application of the time-attention sublayer 540, the time-sliced representations may be reformed into a three-dimensional tensor, and in the example of FIG. 5, as an output of the encoding block.

Each of the sublayers may apply trained computer model layers to the respectively-sliced representations and may include residual connections, normalization layers (such as the illustrated ScaleNorm), and other layers (not shown) for the respective dimensions. Each of the sublayers may also apply an attention layer and a feedforward layer to the sliced representations.

For the event-attention sublayer 520, the event-sliced representations may be combined with event type embeddings 510. In embodiments in which the event types may not be an input to or otherwise encoded in the input layer, the event type embeddings 510 may inject information about the event types to the respective event-sliced representation. The event type embeddings 510 may be determined during training and may have the same dimensionality of the event-sliced representations (the number of time bins times the embedding dimensionality). In effect, the "label" denoting the event type may thus be introduced by combining the event type embeddings 510 with the respective event types in the layer input and may be injected at multiple encoding blocks enabling the event type to be more richly represented and a common event embedding layer to be applied in generating the instance representation 230, as discussed above.

Next, the event-attention sublayer 520 applies a normalization layer; here, a ScaleNorm, followed by an event-based attention layer. The event-based attention layer may apply an attention mechanism, such as a multi-headed attention mechanism, to the event-sliced representations, resulting in an attention that is applied event-wise across the sublayer input. The attention mechanism may project the event-sliced representation to key, query, and value matrices for attending to the different events. In the embodiment shown in FIG. 5, the event-attention sublayer 520 includes a residual connection of the attention layer to the normalization input and provides the result to a further normalization layer for input to an event-wise feedforward layer. The event-wise feedforward layer applies a feedforward network layer, such as an MLP, event-wise to each of the event-sliced representations, such that each of the event-sliced representations is modified by the feedforward layer based on its prior value. In this example, a further residual connection combines the feedforward output with the residual output of the attention layer and the resulting event-sliced representations are output from the event-attention sublayer 520. The event-sliced representations may then be restructured into time-sliced representations for use by the time-attention sublayer 540.

The time-attention sublayer 540 may operate similarly to the event-attention sublayer 520, except with respect to the time-sliced representations. Rather than event type embeddings 510, the time embeddings 530 may represent a characterization of the time bins. Although the time bins are in the same sequential structural order for each instance, the amount of time represented by each time bin may differ because the length of each data instance may differ. For example, with four time bins, a data instance spanning two days yields twelve hours represented in each time bin, while a data instance spanning eight days yields two days represented in each time bin. The time embeddings 530 may thus represent time information associated with the time bins. In one embodiment, the time embeddings 530 are generated based on the start and end time of each time bin and may be processed by a feedforward network to generate a time embedding for the time bin. In one embodiment, the feedforward network for generating the time embeddings uses a continuous value embedding, such as a fully-connected feedforward network layer of size $\sqrt{(n_e+1)d}$ and a tanh activation, followed by an output layer that produces a time embedding in $\mathbb{R}^{(n_e+1)d}$. As such, the time embeddings may incorporate continuous time information and be adapted to the data. As such, similar to the event type embeddings 510, the time embeddings 530 may provide additional time bin information to the incoming time-sliced representations for processing by the time-attention sublayer 540.

The time-attention sublayer 540 in this example includes normalization layers and residual connections as discussed above. The time-based attention layer applies an attention mechanism across the time-sliced representations, such that the attention layer may be applied across different time bins within the time-attention sublayer 540. Finally, the time-wise feedforward layer applies a feedforward layer to each respective time-sliced representation, such that the output time-sliced representation is modified based on itself. The resulting outputs from the time-attention sublayer 540 may then be restructured as discussed above to the three-dimensional shape of the layer output 550.

As also noted above, a number of such encoding blocks may be sequentially applied, such that the final layer output 550 may be used as the encoded instance representation for the data instance.

Model Training

The various embeddings, computer model layers, and other parameters of the model may be trained, e.g., by a model training module 120 based on a set of training data 140. The model training module 120 may apply multiple types of training. Initially, training may include self-supervised learning approaches, in which portions of the input data are masked and parameters of the model are trained to effectively learn to predict the values of the masked inputs. This self-supervised learning may be used to encourage the model to learn effective representations and parameters across both the event and time bin dimensions that can be used to effectively characterize different data instances. The self-supervised learning may be used with a training data set that has similar input characteristics, even where they may lack additional labels for further tasks, such as a more specific objective of a decoder. Another training process may be applied, typically after self-supervised learning, to fine-tune the model to a specific task.

Figure 6:
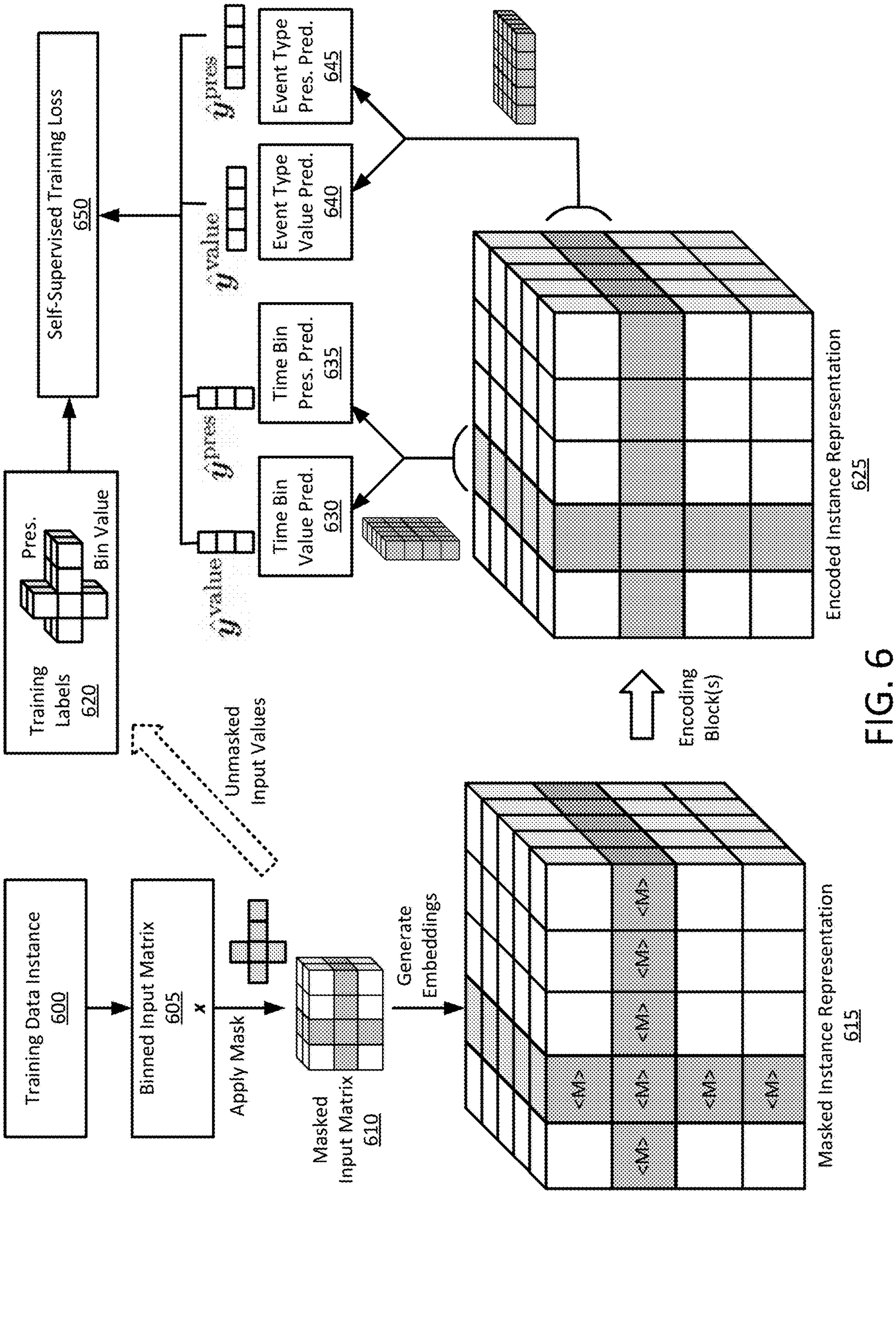
FIG. 6 shows an example of self-supervised training for a sequenced multi-event transformer model, according to one embodiment.

FIG. 6 shows an example of self-supervised training for a sequenced multi-event transformer model, according to one embodiment. FIG. 6 illustrates the generation of a self-supervised training loss 650 for a training data instance 600, which may be repeated for additional training data instances and applied to modify model parameters in one or more iterative batches. In general, the self-supervised learning applies a mask across an event and/or a time bin and attempts to learn parameters for accurately predicting the masked portions of the input. In this example, the mask may be applied to a binned input matrix 605 (and corresponding event count) of the training data instance 600, which may include an aggregated bin value for each event type.

As shown in FIG. 6, the mask may be applied to one or more events and time bins, in this example the second event type and the second time bin, resulting in a masked input matrix 610. The values of the binned input matrix 605 along with the count of the event may then be identified and used as a set of training labels 620 for the predictive task of the self-supervised learning. Parameters of the event embedding layer, static embedding layer, and other processes are then applied to generate a masked instance representation 615 as discussed above. The masked instance representation 615 may include a learned "mask" token, designated as <M>, for the events and time bins that were masked in the masked input matrix 610. Next, the parameters of the encoder and respective encoding blocks are applied to generate a corresponding encoded instance representation 625 according to the current model parameters.

To perform self-supervised training, in one embodiment, the values that were masked are predicted based on the respective slices of the encoded instance representation 625. As such, a decoder/prediction head may be attached to the corresponding event or time bin dimension to generate a respective value and presence predictions. The presence prediction may predict the presence of the event type in the time bin as a likelihood (e.g., any value >0 of the "count" for a time bin). Specifically, the time bin dimension of the encoded instance representation 625 is used to generate a time bin value prediction 630 and a time bin presence prediction 635. In this example, as the second time bin was masked, the values of the encoded instance representation 625 from the second time bin are used to generate predictions of the second time bin. Similarly, the masked event type is used to generate an event type value prediction 640 and an event type presence prediction 645.

The various predictions may then be compared with the bin value and presence training labels 620 to generate a self-supervised training loss 650. The respective types of training loss (bin value and presence) may be evaluated with suitable loss functions and combined with any suitable approach, such as a weighted combination. In one embodiment, the bin value predictions are evaluated with a squared error loss as the particular values may exist in a range, and the presence predictions are evaluated with a cross-entropy loss as the presence is evaluated as a Boolean value (event count as 0 or >0). As such, the loss function $\mathcal{L}_{i,j}$ determined as the self-supervised training loss 650 for a particular position i,j (corresponding to event type i and time bin j) is defined in one embodiment as:

$$\mathcal{L}_{i,j} = \mathcal{L}_{i,j}^{value} + \alpha\mathcal{L}_{i,j}^{pres}$$

-continued $$\mathcal{L}_{i,j}^{value} = I[m_{i,j} > 0](\hat{y}_{i,j}^{value} - x_{i,j})^2$$

$$\mathcal{L}_{i,j}^{pres} = -I[m_{i,j} > 0]\log(\hat{y}_{i,j}^{pres})I[m_{i,j} = 0]\log(1 - \hat{y}_{i,j}^{pres})$$

in which α is a hyperparameter affecting respective contribution of the bin value loss $$\mathcal{L}_{i,j}^{value}$$

and presence loss $$\mathcal{L}_{i,j}^{pres},$$

I [ ] is an indicator function (evaluating to 0 or 1),
m is the count matrix, and
x is the binned input matrix.

For each of the masked time bins and event types, the loss may be averaged across the masked inputs. The loss function may then be applied to train the respective model layers and embedding parameters, e.g., by suitable training processes such as gradient descent and backpropagation.

Additional training may also be performed for additional tasks related to the encoded instance representation. As also discussed above, the model parameters may be fine-tuned with respect to additional predictive tasks. For example, labels for a set of fine-tuning training data related to the fine-tuning task may be used as target decoder outputs for training decoder outputs relative to current model parameters applied to the sequenced data of the fine-tuning training data. Various portions of the encoded instance representation may be used for different decoding tasks. In one embodiment, the "time bin" corresponding to the added representation token is used for the decoding task. During the fine-tuning with respect to specific tasks, the representation token itself may be trained, such that the representation token added to the instance representation (e.g., before the encoder) is learned during the fine-tuning and may be optimized for specific tasks.

Together, this approach permits effective representation of complex multi-event data across time that can apply full attention across time and event data, enabling more effective encoding and prediction than prior systems with a reduced runtime and complexity. By using time binning to adapt the length and granularity of the input sequence, the size of the encoder input may be controlled despite dynamic input size and variation in event quantity. Relative to input representations that attempt to encode each event individually, this approach reduces encoder complexity because the number of time bins and event types is typically significantly lower than the number of total events.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for machine interpretation of multi-event time-series data, comprising:
- a processor;
- a non-transitory computer-readable medium having instructions executable by the processor for:
  - identifying an instance representation of a time-series data instance, the instance representation including a multi-dimensional representation of a plurality of event types across a plurality of time bins for the time-series data instance;
  - generating an encoded instance representation by applying one or more machine-learned encoding blocks to the instance representation, at least one of the machine-learned encoding blocks including:
    - an event-attention sublayer that applies an event-based attention layer across event types of event-sliced representations of a first sublayer input to the event-attention sublayer; and a time-wise attention sublayer that applies a time-based attention layer across time bins of time-sliced representations of a second sublayer input to the time-attention sublayer; and generating a decoder output by applying a machine-learned decoder to the encoded instance representation.

2. The system of claim 1, wherein the instructions are further executable by the processor for determining the multi-dimensional representation for each of the plurality of events at each of the plurality of time bins by applying an event embedding layer to events of an event type of the time-series data instance in the time bin.

3. The system of claim 2, wherein the event embedding layer is applied to an aggregated value of the events of the event type and a count of the events of the event type in an event bin.

4. The system of claim 1, wherein the instance representation includes, for each time bin of the plurality of time bins, a static data embedding.

5. The system of claim 1, wherein the instance representation includes a time bin including a learned representation token.

6. The system of claim 1, wherein the machine-learned encoding blocks includes a plurality of encoder blocks sequentially applied to the instance representation, the plurality of the encoder blocks including respective event-attention sublayers and time-wise attention sublayers.

7. The system of claim 1, wherein the instructions are further executable by the processor for training parameters of the machine-learned encoding blocks based on masked values of the time-series data instance.

8. The system of claim 7, wherein the instructions are further executable by the processor for fine-tuning parameters of the machine-learned encoding blocks based on labeled decoder outputs for a set of fine-tuning training data.

9. The system of claim 1, wherein the time-series data instance describes a sequence of health-related events.

10. The system of claim 1, wherein the time-series data instance describes a sequence of finance-related events.

11. A method for machine interpretation of multi-event time-series data, the method comprising:

identifying an instance representation of a time-series data instance, the instance representation including a multi-dimensional representation of a plurality of event types across a plurality of time bins for the time-series data instance;

generating an encoded instance representation by applying one or more machine-learned encoding blocks to the instance representation, at least one of the machine-learned encoding blocks including:

an event-attention sublayer that applies an event-based attention layer across event types of event-sliced representations of a first sublayer input to the event-attention sublayer; and a time-wise attention sublayer that applies a time-wise attention layer across time bins of time-sliced representations of a second sublayer input to the time-attention sublayer; and generating a decoder output by applying a machine-learned decoder to the encoded instance representation.

12. The method of claim 11, further comprising determining the multi-dimensional representation for each of the plurality of events at each of the plurality of time bins by applying an event embedding layer to events of an event type of the time-series data instance in the time bin.

13. The method of claim 12, wherein the event embedding layer is applied to an aggregated value of the events of the event type and a count of the events of the event type in an event bin.

14. The method of claim 11, wherein the instance representation includes, for each time bin of the plurality of time bins, a static data embedding.

15. The method of claim 11, wherein the instance representation includes a time bin including a learned representation token.

16. The method of claim 11, wherein the machine-learned encoding blocks includes a plurality of encoder blocks sequentially applied to the instance representation, the plurality of the encoder blocks including respective event-attention sublayers and time-wise attention sublayers.

17. The method of claim 11, further comprising training parameters of the machine-learned encoding blocks based on masked values of the time-series data instance.

18. The method of claim 17, further comprising fine-tuning parameters of the machine-learned encoding blocks based on labeled decoder outputs for a set of fine-tuning training data.

19. The method of claim 11, wherein the time-series data instance describes a sequence of health-related events.

20. The method of claim 11, wherein the time-series data instance describes a sequence of finance-related events.

* * * * *